Dec. 9, 1941.   A. F. HESSE ET AL   2,265,905
BOLT AND LOCK WASHER
Filed Oct. 2, 1939
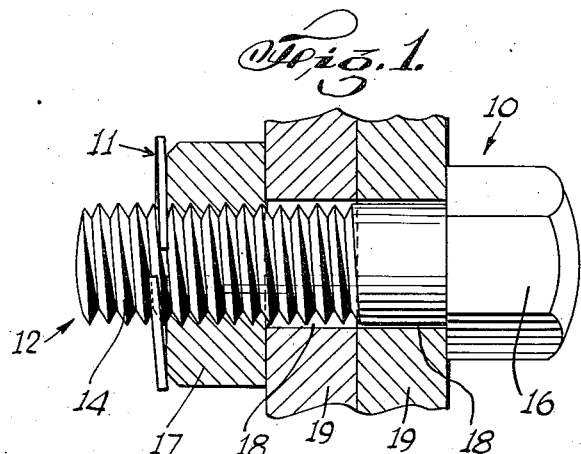
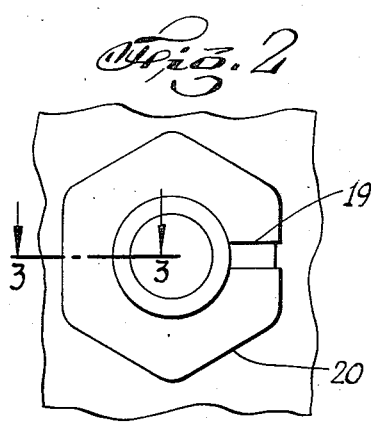
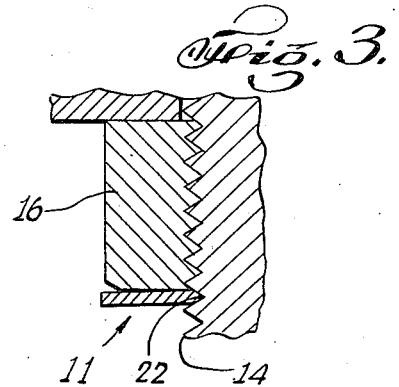
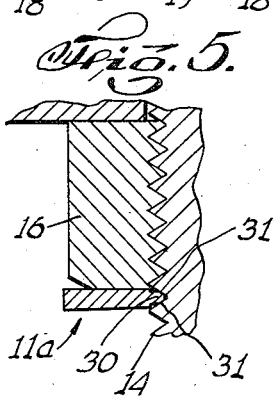
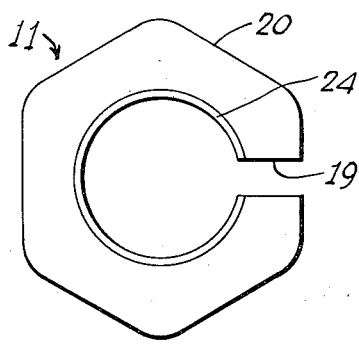
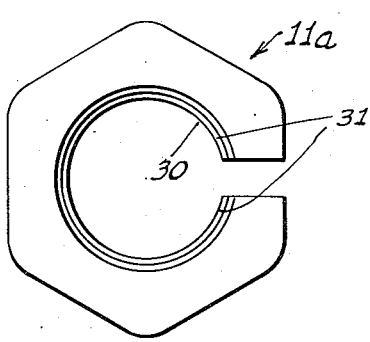
INVENTORS
ALBERT F. HESSE
HUGO DUMKE
BY
Carl Miller
ATTORNEY Patented Dec. 9, 1941

2,265,905

UNITED STATES PATENT OFFICE 2,265,905

BOLT AND LOCK WASHER

Albert F. Hesse, Hoboken, and Hugo Dumke, West New York, N. J., assignors of one-third to Jack Rubenstein, West New York, N. J.

Application October 2, 1939, Serial No. 297,560

1 Claim. (Cl. 151—30)

This invention relates to bolts and lock washers therefor.

An object of this invention is to provide an improved lock washer for a bolt which may be easily applied and which will positively lock the nut against loosening.

A further object of this invention is to provide a strong and durable lock washer of the character described, which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a side elevational view of a bolt and lock washer embodying the invention, with parts in cross-section;

Fig. 2 is an end view thereof;

Fig. 3 is a cross-sectional view taken on line 3—3 of Fig. 2;

Fig. 4 is a top plan view of the improved lock washer;

Fig. 5 is a cross-sectional view similar to Fig. 3, but illustrating a modified construction of lock washer; and Fig. 6 is a top plan view of the lock washer of Fig. 5.

Referring now in detail to the drawing, 10 designates a bolt provided with a lock washer 11 embodying the invention. The bolt 10 comprises a screw 12 having a screw threaded shank 14 and a polygonal head 16. Screwed to the shank 14 is a usual nut 17.

As shown in the drawing, the shank of the bolt passes through openings 18 in plates 19, and the nut is tightened on the shank of the screw to attach said plates together.

The improved lock washer 11 is made of a thin metal plate, and has a central opening, and is split radially, as at 19. The outer edge 20 of the washer may be polygonal, preferably similar to the shape of the nut 17, so that the washer may be released by the use of a wrench.

The inner edge 22 of the washer 11 is helical to engage within the groove of the screw thread 14. In other words, the pitch of the helical inner edge 22 is similar to the pitch of the screw thread 14. The inner edge portion of the washer 14 is preferably beveled on both sides, as at 24, and the bevel preferably extends to the bevel of the screw threads 14.

The lock washer preferably fits rather loosely on the screw portion 14 of the screw, so that it may be rotated quickly against the nut 17 to lock the same and prevent accidental loosening of the nut.

The lock washer 11 may be released by turning the same with a wrench, and then may be unscrewed any suitable distance by merely turning the same easily on the screw.

In Figs. 5 and 6 there is shown a lock washer 11a, similar to the lock washer 11, with the exception that at the inner edge of the lock washer, there is a portion 30 of reduced thickness, and said portion 30 is beveled, as at 31, on opposite sides, to correspond to the bevel of the screw threads 14 of the bolt.

It will thus be seen that there is provided a device in which the several objects of this invention are achieved, and which is well adapted to meet the conditions of practical use.

As various possible embodiments might be made of the above invention, and as various changes might be made of the embodiments above set forth, it is to be understood that all matter herein set forth or shown in the accompanying drawing is to be interpreted as illustrative and not in a limiting sense.

Having thus described our invention, we claim as new and desire to secure by Letters Patent:

A lock washer of the character described, having a central opening, and being split radially, and having an inner edge of helical shape, and said lock washer having an intermediate portion of reduced thickness terminating in said inner edge, and the latter being beveled on opposite sides.

ALBERT F. HESSE.
HUGO DUMKE.